(12) United States Patent
Nedeltchev et al.

(10) Patent No.: US 10,360,606 B2
(45) Date of Patent: Jul. 23, 2019

(54) CROWD-SOURCED CLOUD COMPUTING IN A MULTIPLE RESOURCE PROVIDER ENVIRONMENT

(71) Applicant: Cisco Technology, Inc., San Jose, CA (US)

(72) Inventors: Plamen Nedeltchev, San Jose, CA (US); David Delano Ward, Los Gatos, CA (US); Alon Shlomo Bernstein, Monte Sereno, CA (US); Mohit Agrawal, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 349 days.

(21) Appl. No.: 15/214,003

(22) Filed: Jul. 19, 2016

(65) Prior Publication Data

US 2018/0025399 A1     Jan. 25, 2018

(51) Int. Cl.

| | |
|---|---|
| *G06Q 30/00* | (2012.01) |
| *G06Q 30/06* | (2012.01) |
| *G06F 16/958* | (2019.01) |
| *G06F 16/9535* | (2019.01) |
| *G06F 16/955* | (2019.01) |
| *H04L 29/08* | (2006.01) |
| *G06F 9/50* | (2006.01) |
| *G06Q 50/00* | (2012.01) |

(52) U.S. Cl.
CPC ....... *G06Q 30/0603* (2013.01); *G06F 9/5061* (2013.01); *G06F 16/958* (2019.01); *G06F 16/9535* (2019.01); *G06F 16/9558* (2019.01); *G06Q 30/0625* (2013.01); *H04L 67/16* (2013.01); *G06Q 50/01* (2013.01)

(58) Field of Classification Search
USPC ...................................................... 705/26.1
See application file for complete search history.

(56) References Cited

U.S. PATENT DOCUMENTS

| | | |
|---|---|---|
| 7,069,560 B1 | 6/2006 | Cheyer |
| 7,515,899 B1 | 4/2009 | Carr et al. |
| 7,870,044 B2 | 1/2011 | Robertson et al. |

(Continued)

FOREIGN PATENT DOCUMENTS

| | | |
|---|---|---|
| WO | 0114961 A2 | 3/2001 |
| WO | 2016040889 A1 | 3/2016 |

OTHER PUBLICATIONS

Tran, "Office Action issued U.S. Appl. No. 14/851,437, filed Sep. 11, 2015,", dated Jul. 18, 2017, 18 pages.

(Continued)

*Primary Examiner* — Mila Airapetian
(74) *Attorney, Agent, or Firm* — Johnson, Marcou & Isaacs, LLC

(57) ABSTRACT

A crowd-sourced cloud environment allows for, and benefits from, modes of interaction between among the service providers (including the "resource providers" and the "cloud provider") and consumers (also referred to herein as "tenants") that are not practiced in a DC-centric cloud environment—specifically, the use of Internet-based social networking technology and Internet-based online marketplace technology to facilitate resource pooling and interaction between crowd-sourced cloud resource providers, the cloud provider, and crowd-sourced cloud consumers.

18 Claims, 11 Drawing Sheets

(56) References Cited

U.S. PATENT DOCUMENTS

| | | | |
|---|---|---|---|
| 8,001,232 | B1 | 8/2011 | Saulpaugh |
| 8,296,765 | B2 | 10/2012 | Kurdi et al. |
| 8,793,313 | B2 | 7/2014 | Kern et al. |
| 8,793,478 | B2 | 7/2014 | Jaber et al. |
| 8,935,366 | B2 | 1/2015 | Mehr et al. |
| 9,401,954 | B2 | 7/2016 | Jagana |
| 9,485,323 | B1 | 11/2016 | Stickle et al. |
| 9,531,745 | B1 | 12/2016 | Sharma |
| 9,588,790 | B1 | 3/2017 | Wagner et al. |
| 9,628,379 | B2 | 4/2017 | Nedeltchev et al. |
| 9,848,041 | B2 | 12/2017 | Einkauf |
| 9,952,908 | B2 | 4/2018 | Nedeltchev et al. |
| 2002/0019844 | A1 | 2/2002 | Kurowski et al. |
| 2003/0115374 | A1 | 6/2003 | Waldo et al. |
| 2005/0081097 | A1 | 4/2005 | Bacher et al. |
| 2006/0031509 | A1 | 2/2006 | Ballette et al. |
| 2007/0276899 | A1 | 11/2007 | Martin et al. |
| 2008/0162637 | A1 | 7/2008 | Adamczyk et al. |
| 2008/0276249 | A1 | 11/2008 | Dynarski |
| 2009/0171855 | A1 | 7/2009 | Hubbard et al. |
| 2009/0265473 | A1 | 10/2009 | Hydrie et al. |
| 2010/0077069 | A1 | 3/2010 | Kim et al. |
| 2010/0248698 | A1 | 9/2010 | In et al. |
| 2010/0281095 | A1 | 11/2010 | Wehner et al. |
| 2011/0055399 | A1 | 3/2011 | Tung et al. |
| 2011/0138047 | A1 | 6/2011 | Brown |
| 2011/0153812 | A1 | 6/2011 | Yoon et al. |
| 2011/0296023 | A1 | 12/2011 | Ferris et al. |
| 2012/0198075 | A1 | 8/2012 | Crowe et al. |
| 2012/0246322 | A1 | 9/2012 | Patil et al. |
| 2013/0042004 | A1 | 2/2013 | Boss et al. |
| 2013/0174053 | A1* | 7/2013 | Torrenegra ............... H04L 51/32 715/752 |
| 2013/0318241 | A1 | 11/2013 | Acharya |
| 2014/0047526 | A1 | 2/2014 | Huang et al. |
| 2015/0007185 | A1 | 1/2015 | Mukherjee et al. |
| 2015/0134396 | A1 | 5/2015 | Mukherjee |
| 2015/0334696 | A1 | 11/2015 | Gu |
| 2016/0080477 | A1 | 3/2016 | Nedeltchev |
| 2016/0087940 | A1 | 3/2016 | Miller et al. |
| 2016/0140359 | A1 | 5/2016 | Mukherjee et al. |
| 2016/0301661 | A1 | 10/2016 | Poirier et al. |
| 2018/0013696 | A1 | 1/2018 | Nedeltchev |
| 2018/0025399 | A1 | 1/2018 | Nedeltchev |

OTHER PUBLICATIONS

"How BOINC works", https://boinc.berkeley.edu/wiki/How_BOINC_works, Jul. 21, 2013, 2 pages.

"VXLAN Overview: Cisco Nexus 9000 Series Switches", http://www.cisco.com/c/en/us/products/collateral/switches/nexus-9000-series-switches/white-paper-c11-729383.html, Feb. 15, 2014, 7 pages.

Jariwala, "11 Cloud OS (Operating Systems) you might want to give a try", http://www.techstagram.com/2013/09/19/8-cloud-os/, Sep. 19, 2013, 9 pages.

Mahalingam, et al., "VXLAN: A Framework for Overlaying Virtualized Layer 2 Networks over Layer 3 Networks draft-mahalingam-dutt-dcops-vxlan-02", draft-mahalingam-dutt-dcops-vxlan-02—Virtual eXtensible Local Area Network (VXLAN): A Framework for Overlaying Virtualized Layer 2 Networks, Aug. 22, 2012, 20 pages.

Marosi, et al., "Towards a Volunteer Cloud System", Future Generations Computer System, vol. 29, No. 6, Mar. 27, 2012, pp. 1442-1451.

Verma, et al., "An architecture for Load Balancing Techniques for Fog Computing Environment", vol. 6, No. 2, Apr.-Sep. 2015 pp. 269-274, 6 pages.

Wirtz, "International Search Report and Written Opinion issued in International Application No. PCT/US2015/049823,", dated Jan. 5, 2016, 13 pages.

Wittmann-Regis, "International Preliminary Report on Patentability issued in International Application No. PCT/US2015/049823", dated Mar. 14, 2017, 8 pages.

Widhalm De Rodriguez, "Final Office Action in U.S. Appl. No. 15/203,767", dated Sep. 7, 2018, 13 pages.

Symantec Corporation: "E-security begins with sound security policies", Announcement Symantec, Jun. 14, 2001; XP002265695.

Alecu, "Extended European Search Report for EP 17178569.4;", dated Dec. 22, 2017, 9 pages.

Anonymous:, "Service catalog—Wikipedia," Sep. 14, 2015, pp. 1-5, Retrieved from the Internet: URL:https://en.wikipedia.org/w/index.php?title=Service catalog&oldid=681033936 [retrieved on Nov. 30, 2017].

Dieben, "Extended European Search Report for EP 17180851.2;", dated Dec. 19, 2017, 10 pages.

Widhalm De Rodrig, "Office Action issued U.S. Appl. No. 15/203,767, filed Jul. 6, 2016,", dated Feb. 8, 2018, 13 pages.

Widhalm De Rodri, "Office Action in U.S. Appl. No. 15/203,767", dated Apr. 15, 2019, 12 pages.

U.S. Appl. No. 14/851,437 to Nedeltchev et al. filed Sep. 11, 2015.

U.S. Appl. No. 15/203,767 to Nedeltchev et al. filed Jul. 6, 2016.

\* cited by examiner

700

```
┌─────────────────────────────────────────────────────────────────────────┐
│ Receive a registration for participation of resources of a resource     │
│ provider in a crowd-sourced computing cloud, a 1st provider             │
│ registration including an intent to pool                                │
│                              710                                        │
└─────────────────────────────────────────────────────────────────────────┘
                                    ▼
┌─────────────────────────────────────────────────────────────────────────┐
│ Register the specified resources and provider characteristic of each    │
│ of the providers                                                        │
│                              220                                        │
└─────────────────────────────────────────────────────────────────────────┘
                                    ▼
┌─────────────────────────────────────────────────────────────────────────┐
│ Determine at least one crowd-sourced cloud computing service to be      │
│ offered based on the registered resources of at least one provider      │
│                              230                                        │
└─────────────────────────────────────────────────────────────────────────┘
                                    ▼
┌─────────────────────────────────────────────────────────────────────────┐
│ Publish a searchable service catalog of each determined service, each   │
│ service catalog entry identifying a provider of the service described   │
│ in the entry                                                            │
│                              240                                        │
└─────────────────────────────────────────────────────────────────────────┘
                                    ▼
┌─────────────────────────────────────────────────────────────────────────┐
│ Publish a catalog of provider profiles based on received registrations, │
│ and searchable by provider characteristics, resource specification      │
│ parameters, and services                                                │
│                              550                                        │
└─────────────────────────────────────────────────────────────────────────┘
                                    ▼
┌─────────────────────────────────────────────────────────────────────────┐
│ Receive, from a 2nd provider, a request to pool a subset of the 2nd     │
│ provider's resources with the subset of the resources of the 1st        │
│ provider                                                                │
│                              760                                        │
└─────────────────────────────────────────────────────────────────────────┘
                                    ▼
┌─────────────────────────────────────────────────────────────────────────┐
│ Pool the subset of the 2nd provider's registered resources and the      │
│ subset of the registered resources of the 1st provider                  │
│                              770                                        │
└─────────────────────────────────────────────────────────────────────────┘
                                    ▼
┌─────────────────────────────────────────────────────────────────────────┐
│ Determine at least one service to be offered based on the pooled        │
│ resources, update the services catalog based on the determined          │
│ services, update the provider profile catalog with a profile of the     │
│ resource pool                                                           │
│                              780                                        │
└─────────────────────────────────────────────────────────────────────────┘
```

```
┌─────────────────────────────────────────────────────────────────────────────┐
│ Receive, for each resource provider, a registration for participation of    │
│ resources of the provider in a crowd-sourced computing cloud                │
│                                    210                                      │
└─────────────────────────────────────────────────────────────────────────────┘
                                      ↓
┌─────────────────────────────────────────────────────────────────────────────┐
│   Register the specified resources and provider characteristic of each of   │
│                              the providers                                  │
│                                    220                                      │
└─────────────────────────────────────────────────────────────────────────────┘
                                      ↓
┌─────────────────────────────────────────────────────────────────────────────┐
│ Determine at least one crowd-sourced cloud computing service to be offered  │
│        based on the registered resources of at least one provider           │
│                                    230                                      │
└─────────────────────────────────────────────────────────────────────────────┘
                                      ↓
┌─────────────────────────────────────────────────────────────────────────────┐
│ Publish a searchable service catalog of each determined service, each       │
│ service catalog entry including an identifier of a provider of the service  │
│                       described in the entry                                │
│                                    240                                      │
└─────────────────────────────────────────────────────────────────────────────┘
                                      ↓
┌─────────────────────────────────────────────────────────────────────────────┐
│                    Receive selection of a published service                 │
│                                    950                                      │
└─────────────────────────────────────────────────────────────────────────────┘
                                      ↓
┌─────────────────────────────────────────────────────────────────────────────┐
│                        Provision the published service                      │
│                                    960                                      │
└─────────────────────────────────────────────────────────────────────────────┘
                                      ↓
┌─────────────────────────────────────────────────────────────────────────────┐
│                         Operate the provisioned service                     │
│                                    970                                      │
└─────────────────────────────────────────────────────────────────────────────┘
```

FIG. 9

CROWD-SOURCED CLOUD COMPUTING IN A MULTIPLE RESOURCE PROVIDER ENVIRONMENT

TECHNICAL FIELD

The disclosed technology relates to delivery of computing as a service. In particular, example embodiments relate to resource pooling in a crowd-sourced cloud in a multiple resource provider environment.

BACKGROUND

"Cloud computing" refers to a model for enabling ubiquitous, convenient, on-demand network access to a shared pool of configurable computing resources (e.g., networks, servers, storage, applications, and services) that may be rapidly provisioned and released with minimal management effort or service provider interaction. The cloud computing model is characterized by on-demand self-service, broad network access, resource pooling, rapid elasticity, and measured service. Cloud computing service models include software as a service (SaaS), platform as a service (PaaS), and infrastructure as a service (IaaS), Data as a Service (DaaS) and Analytics as a Service (AaaS). Cloud computing deployment models include public clouds, private clouds, community clouds, and hybrid combinations thereof. The cloud model can allow end users to reduce capital expenditures and burdensome operating costs associated with maintaining substantial information technology expertise and operating staff in house.

BRIEF DESCRIPTION OF THE DRAWINGS

FIG. 7 is a block flow diagram depicting a method to provide crowd-sourced cloud computing services, in accordance with certain example embodiments.

FIG. 9 is a block flow diagram depicting a method to provide crowd-sourced cloud computing services, in accordance with certain example embodiments.

DETAILED DESCRIPTION OF EXAMPLE EMBODIMENTS

Figure 1:
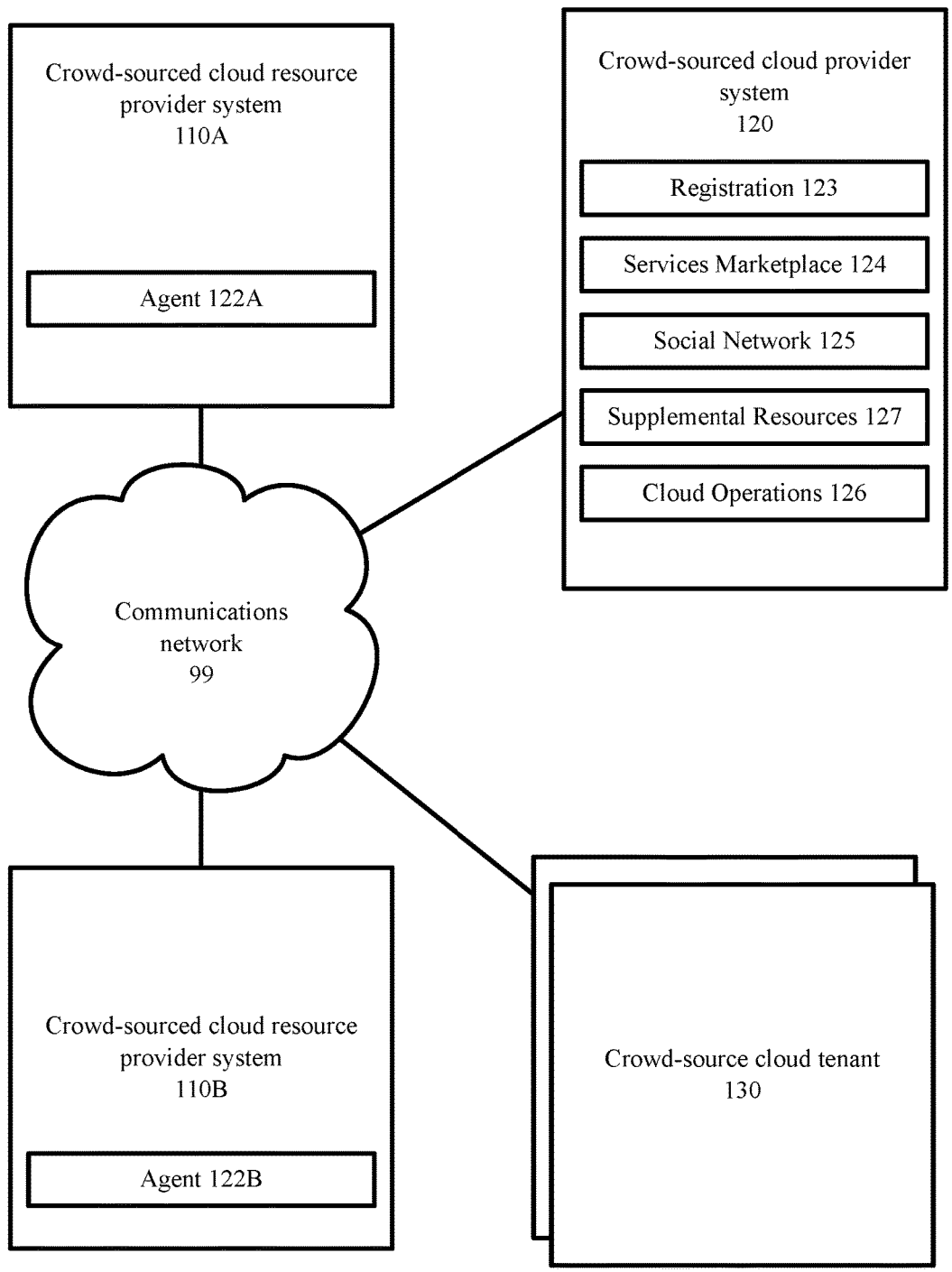
FIG. 1 is a block diagram depicting a communications and processing architecture for a crowd-sourced cloud, in accordance with certain example embodiments.

"Social networking services" refers to Internet-based platforms, often built as Web 2.0 applications, in which users create profiles that are maintained by the operator of the social network service. User-generated content, such as posts visible to some or all other users of the platform, dominates most social networking services. Private messaging, search features, news posted by the social network service operator, along with user-generated content, allow users and groups of users to form and sustain social networks.

"Online marketplace" or "online retailer" or "online shopping" typically refer, interchangeably, to a type of electronic commerce, typically an Internet website, where products and services can be offered by a marketplace operator or third parties, or a combination thereof, in an environment established and maintained by the marketplace operator. Typically, the marketplace operator conducts, or at least supervises, transactions between consumers and the offering parties. Offering parties can register with the online marketplace and sell goods or services to consumers for a fee paid to the marketplace operator.

Today, many computing workloads run on traditional big data center (DC) environments either offered by public or private cloud providers. These DCs are built on dedicated physical facilities that come with high complexity, high initial cost, and high setup and maintenance cost. Setting up a DC includes physical facility procurement, legal processes and local authority clearance, purchasing an installing DC resources (for example, computing, racks, storage, network, and cabling), electrical power distribution system setup and maintenance, and significant headcount and overhead in hiring a skilled team to manage the infrastructure and other resources.

Crowd-sourced cloud computing introduces a new cloud computing deployment model involving a cloud provider, multiple cloud resource providers, and multiple tenants/consumers. In such a model, computing resources of each of multiple resource providers, such as residential subscribers to an Internet Service Provider (ISP), are logically partitioned into a resource provider end user partition and a resource provider crowd-sourced cloud partition. One or more crowd-sourced cloud agents are installed in each crowd-sourced resource provider partition. Orchestration of the crowd-sourced cloud can proceed in a cloud provider computing system and in each agent. Orchestration can include: registering (using both the crowd-sourced cloud provider computing systems and the agents) at least one resource of a resource provider with the crowd-sourced cloud provider computing system; validating the registered resources as being available for provisioning to meet service requests from crowd-sourced cloud tenants; publishing each registered service as available to consumers (potential tenants); receiving a request for crowd-sourced cloud services by the cloud provider computing system; provisioning the requested services; and operating each provisioned service.

Typical network architectures may be designed for centralized and static, location-specific, client-server ("north-south") environments. Such networks may be designed for traffic patterns originating from the corporate network environment and that primarily traverse a corporate network edge. Such an approach may enable service offerings, including cloud services, from centralized data center ("DC") locations to remote branch partner or home locations. While "home" is used for simplicity in the present disclosure, other entities, such as businesses, schools, and universities, could all participate in a crowd-sourced cloud as resource providers. These entities can provide computing resources that can provide computing, network, or storage capacity in a context of space, power, and cooling. For example, as the computing power of vehicles increases, vehicles may be able to participate in a crowd-sourced cloud as providers of services and capacity.

Real-time communications and peer-to-peer traffic patterns are increasingly mobile, and applications are increasingly cloud-based. That design changes the typical traffic patterns from north-south to more bidirectional "east-west," and allows a service provider to offer mobile services from large cloud locations. In 2018, it is expected that up to 60% of data may be resident in decentralized computing with the combination of DC-based data, public clouds, and hybrid clouds.

At the same time, the power of traditional end user environments (south) is exploding. Some estimate that the computing power of the equivalent of a personal computer, such as found in the typical home environment, in 2049 may be equal to all computing power created through 2012. Further, the ability of home environments to offer services and products (south-to-north, south-to-west, and south-to-east traffic) may expand; similarly to how people offer home-generated electrical power to public utilities. This trend opens the door for a form of computing where the consumer can share the excess of his home cloud or IT infrastructure with peers, ISPs, application providers, or third parties. This capability effectively may transform the consumer of goods and services into a "prosumer"—a market resident who owns a home infrastructure and allocates part of it to create a cloud and offer services and products to peers, ISPs, application providers, or third parties. In some embodiments, it allows customers to become entrepreneurs and de-facto application providers and/or crowd-sourced public cloud providers.

The crowd-sourced cloud environment allows for, and benefits from, modes of interaction among the service providers (including the "resource providers" and the "cloud provider") and consumers (also referred to herein as "tenants") that are not practiced in a DC-centric cloud environment—specifically, the use of Internet-based social networking technology and Internet-based online marketplace technology to facilitate interaction between crowd-sourced cloud resource providers, the cloud provider, and crowd-sourced cloud consumers.

Example System Architectures

In example architectures for the technology, while each server, system, and device shown in the architecture is represented by one instance of the server, system, or device, multiple instances of each can be used. Further, while certain aspects of operation of the technology are presented in examples related to the figures to facilitate enablement of the claimed invention, additional features of the technology, also facilitating enablement of the claimed invention, are disclosed elsewhere herein.

As depicted in FIG. 1, the architecture 100 includes network computing devices 110, 120, and 130, each of which may be configured to communicate with one another via communications network 99. Network computing device(s) 110 can include one or more crowd-sourced cloud agents 122A, 122B for participation as a provider of computing resources in a crowd-sourced cloud. In some embodiments, a user associated with a device must install an application and/or make a feature selection to obtain the benefits of the technology described herein.

Network 99 includes one or more wired or wireless telecommunications systems by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device can include a communication module capable of transmitting and receiving data over the network 99. For example, each network device can include a server, or a partition of a server, router VM or container, a portion of a router, a desktop computer, a laptop computer, a tablet computer, a television with one or more processors embedded therein and/or coupled thereto, a smart phone, a handheld computer, a personal digital assistant (PDA), or any other wired or wireless processor-driven device. In some embodiments, the network device 110 may be a partition on an resource provider's computing resource, the network device 120 may be system operated by an ISP or other crowd-sourced cloud service provider, and the network device 130 may be a crowd-sourced cloud tenant system.

Embodiments of the technology disclosed herein allow resource providers to offer services via an online service catalog. The catalog is established and maintained by a cloud provider system 120, for example, an online service catalog organized as an online marketplace 124. While each resource provider can specify services to be offered using its resources 110, in some embodiments, the cloud provider system 120 determines services that a resource provider's resources 110 are capable of providing, and subsequently allows the resource provider to choose to offer one or more such determined services. In some embodiments, the cloud provider system 120 supplements the resource provider's resources 110, for example, the cloud provider system 120 can supplement the IaaS resources 110 of a resource provider with a client-facing application, a web server back end application, and a database application to offer PaaS services to consumer/tenant systems 130 via the marketplace 124.

In some embodiments, a subset of each resource provider's registration information is published in an online resource catalog of provider profiles, organized, for example, as a social networking platform 125. In some such embodiments, each service catalog entry identifies each resource provider offering the service through the cloud provider, hyperlinking the resource provider identifier to the corresponding profile catalog entry.

In some embodiments, the service catalog is searchable by consumers wishing to request crowd-sourced cloud computing services, for example, in ways that an online marketplace 124 is searchable. The online marketplace 124 can be searched in a various ways including, but not limited to, Boolean search and a hierarchical tree. Search results can be filtered by various characteristics of the services and resource providers identified in the service entry.

Each service selected by a consumer can be provisioned for the consumer by the cloud provider 120 using cloud operations 126. The consumer monitors and controls the purchased services via access through consumer system 130 to its own profile in the social network 125.

In some embodiments, operating metrics and/or tenant feedback are collected on the services, for example by the cloud provider system 120 and cloud agents 122 via cloud operations 126. In such embodiments, both services, and resource providers are rated and ranked based on the collected operating metrics and/or tenant feedback. In some embodiments, ratings and rankings (or summaries/indications thereof) are displayed in service catalog entries and profile catalog entries.

In some embodiments, a resource provider indicates an intent to pool resources 110 with the resources 110 of one or more other providers, for example, indicating such intent in the profile catalog/social network 125. In such embodiments, resource providers choosing to pool resources 110 use the profile catalog 125 to search for compatible resources 110 of other providers, and then pool resources with selected compatible providers for supporting service offerings through the cloud provider 120 via the marketplace 124. In such embodiments, once pooled, the resource pool itself is profiled in the profile catalog social network 125, not to the exclusion of the profile for each pool member.

In some embodiments, changes to the provider catalog 125, changes to the services catalog 124, and other events of interest to resource providers, the cloud provider, and consumers/tenants are communicated to the various stakeholders, for example via the social networking application 125. In some embodiments, the technology enables selective subscription to such communications by each type of stakeholder (cloud provider, resource provider, and consumer/tenant).

The network connections illustrated are examples and other approaches for establishing a communications link between the computers and devices can be used. Additionally, those having ordinary skill in the art having the benefit of this disclosure will appreciate that the network devices illustrated in FIG. 1 may have any of several other suitable computer system configurations. For example, one or both of network device 110 and network device 130 can be embodied as a mobile phone or handheld computer, and may not include all the components described above.

Figure 11:
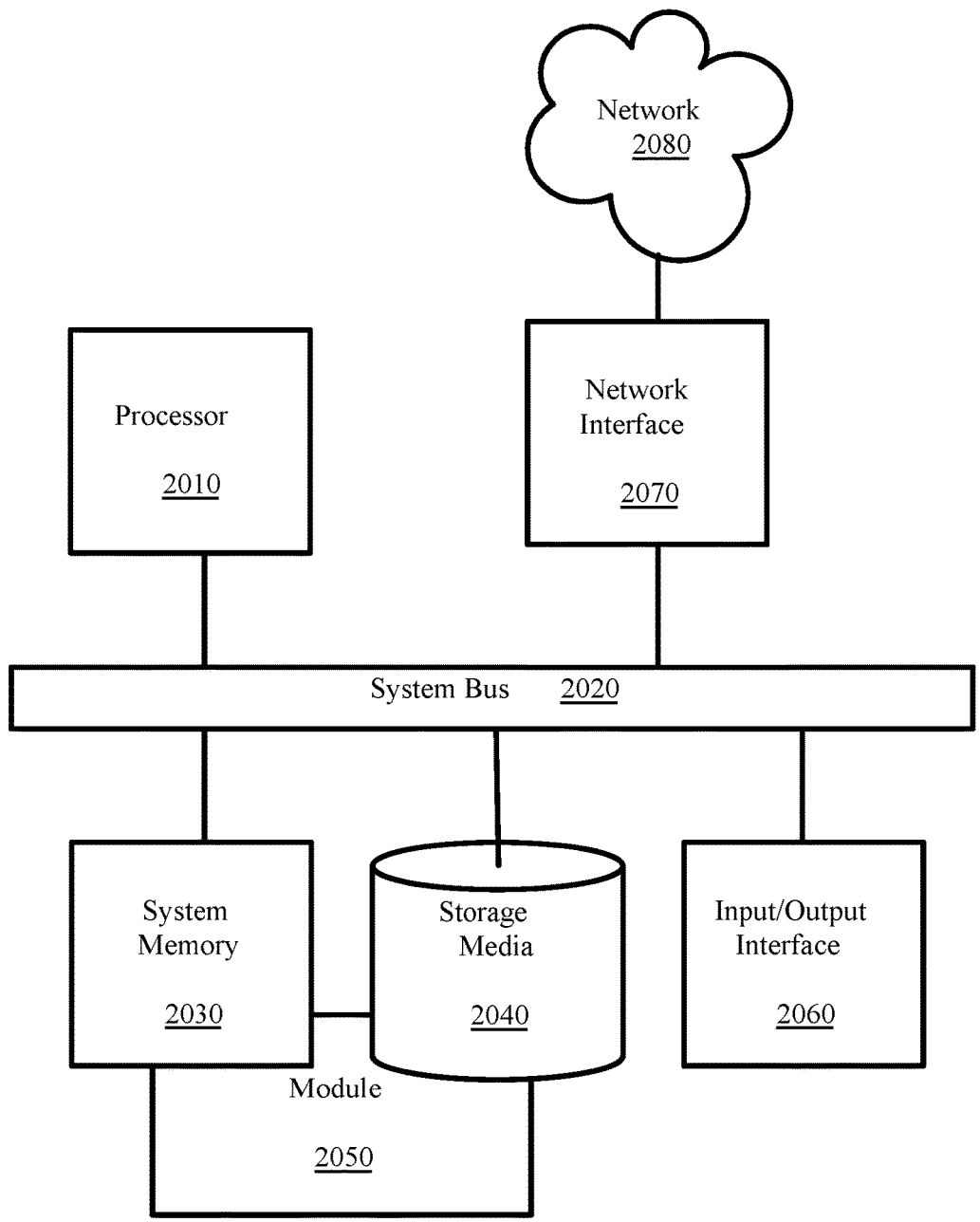
FIG. 11 is a diagram depicting a computing machine and a module, in accordance with certain example embodiments.

In example embodiments, the network computing devices and any other computing machines associated with the technology presented herein may be any type of computing machine such as, but not limited to, those discussed in more detail with respect to FIG. 11. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 11. The computing machines discussed herein may communicate with one another, as well as with other computing machines or communication systems over one or more networks, such as network 99. The network 99 may include any type of data or communications network, including any of the network technology discussed with respect to FIG. 11.

Example Embodiments

The example embodiments illustrated in the following figures are described hereinafter with respect to the components of the example operating environment and example architecture described elsewhere herein. The example embodiments may also be practiced with other systems and in other environments.

Figure 2:
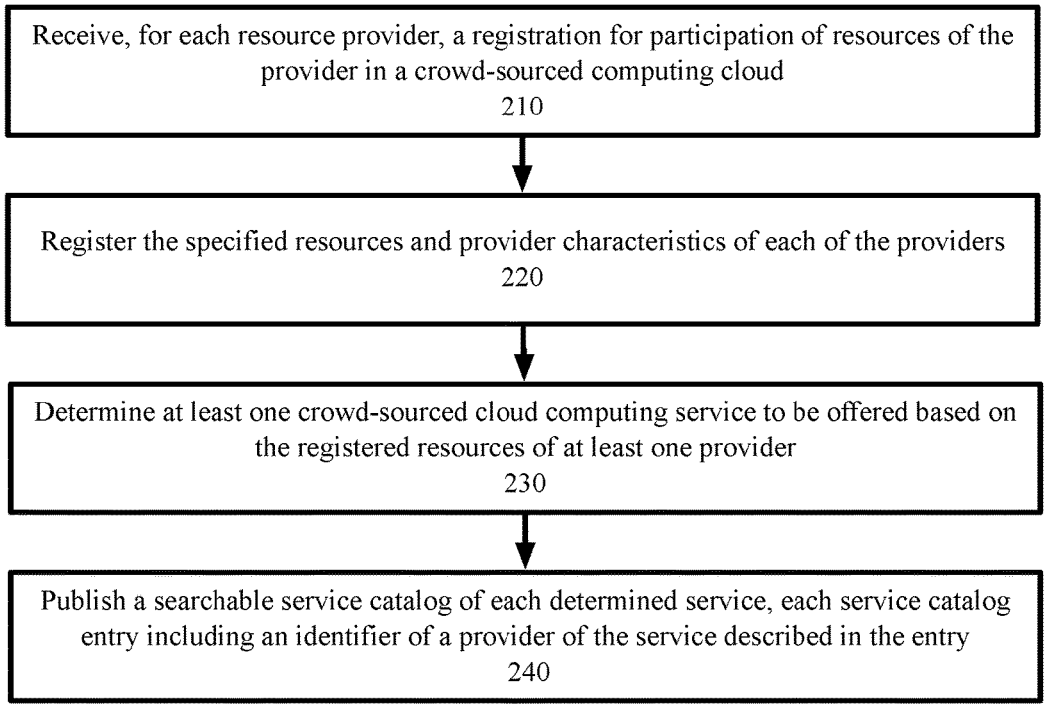
FIG. 2 is a block flow diagram depicting a method to provide crowd-sourced cloud computing services, in accordance with certain example embodiments.

Referring to FIG. 2, and continuing to refer to FIG. 1 for context, a block flow diagram depicting a method 200 to provide crowd-sourced cloud computing services is shown, in accordance with certain example embodiments. In such a method 200, a crowd-sourced cloud provider system 120 receives registration requests for participation of resources 110 of each resource provider in a crowd-sourced computing cloud—Block 210. Each registration request includes provider characteristics and a specification of the resources 110. Each resource specification includes resource specification parameters.

Consider, as a continuing example, two crowd-sourced cloud resource providers—Provider Adam and Provider Lima. Adam submits provider characteristics and resource specifications of resource provider system 110A to a registration portion 123 of a crowd-sourced cloud provider system 120. Provider Lima submits provider characteristics and resource specifications of resource provider system 110B to the registration portion 123 of crowd-sourced cloud provider system 120. Table 1 presents the provider characteristics and resource specifications for Provider Adam and Provider Lima. The parameters and values presented in Table 1 are examples. Note that each of Provider Adam and Provider Lima has registered an intent to participate in pooling of resources 110 as a group for the purpose of providing services.

TABLE 1

| Parameter | Provider Adam | Provider Lima |
|---|---|---|
| Address | 123 ABC Lane, San Jose, USA | 123 XYZ Tower, San Jose, USA |
| Resources | 2 CPUs, 1 TFLOPS, 4 GB RAM, 20 GB storage, 2 Mbps up & down, | 2 CPUs, 1 TFLOPS, 8 GB RAM, 20 GB storage, 4 Mbps up & down |
| Servers | 2 | 3 |
| Connectivity | 10.1.1.1, 10.1.1.2 | 10.2.1.1, 10.2.1.2, 10.2.1.3 |
| Internet Service Provider | ISP #1, router IP address 10.1.1.0 | ISP #1, router IP address 10.2.1.0 |
| Service Level | 50% available processing, 99% available storage, dedicated resources allocation policy per server, no add-on resource flexibility | 70% available, flexible resource allocation policy, add-on resource flexibility |
| Allocation | Split ratio 1:1 | Best effort |
| Add On Resource Limit | N/A | 20% CPU, 20% RAM, 20% storage |
| Operating System Version | Linux, Linux | Windows 8, Linux, Linux |
| Payment options | Credit/debit/bank draft | Credit/debit/bank draft |
| Group intent | Yes | Yes |
| IaaS resource cost | $15/mo. in aggregate | $14/mo. in aggregate |

The cloud provider system 120 registration portion 123 registers the specified resources 110 and provider characteristics of each resource provider—Block 220. In the continuing example, such registration includes determining the reachability of the resources 110 of each provider, deployment of an agent 122 at a host among the provider's system 110, and validating the characteristics of the registered resources 110 using the deployed agent 122. Co-pending U.S. patent application Ser. No. 15/203,767, filed Jul. 6, 2016 and titled "Crowd-Sourced Cloud Computing Resource Validation," describes portions of example registration and validation processes, and is hereby incorporated herein by reference in its entirety.

The cloud provider system 120 determines at least one crowd-sourced cloud computing service to be offered based on the registered resources 110 of at least one provider—Block 230. In the continuing example, cloud provider system 120 determines that Adam's resources 110 A are sufficient to provide various IaaS services at the registered levels, for example: a) 2 CPUs operating at 1 TFLOPS with 4 GB RAM and up to 20 GB of storage over a 2 Mbps link at 50% availability, and b) up to 20 GB of storage at 90% availability over the 2 Mbps link. Cloud provider system 120 presents each of these options to Adam via resource provider system 110A.

In some embodiments, cloud provider system 120 determines the services that can be provided by the registered resources 110 by comparing a registered provider's resource specification to each of a set of reference model specifications. Each reference model specification describes the minimum resources necessary to provide the services of the reference model. Upon a resource provider 110 choosing to offer a particular service, the cloud provider 120 removes the resources necessary to provide the particular service from availability for supporting other services, and re-determines the services that the provider's remaining resources 110 are capable of providing.

In the continuing example, given the low demand for 50% availability computing resources, Adam decides not to offer his computing resources on his own and decides to contribute most of those resources to a pool to achieve higher availability. Adam does, however, decide to offer 5 GB of 90% availability storage as IaaS, and uses resource provider system 110 to communicate this decision to cloud provider system 120. Cloud provider system 120 re-determines that Adam's remaining resources 110 are capable of offering 2 CPUs operating at 1 TFLOPS with 4 GB RAM and up to 15 GB of storage (down 5 GB from the previous determination to account for the service that Adam chose to offer on his own) over a 2 Mbps link at 50% availability as IaaS. Cloud provider system 120 presents this re-determined choice to Adam via resource provider system 110. Adam does not select this option.

It is expected that the primary type of cloud service supported by resource provider resources 110 alone will be IaaS. In some embodiments, the cloud provider system 120 can offer to add supplemental resources 127 to allow the supplemented resources (110 plus 127) to provide PaaS and SaaS services. In the continuing example, cloud provider system 120 can offer to supplement Adam's resources 110 with the supplemental resources 127 {an execution runtime, a web server front end application, a web server back end application, a database, and development tools (all running on Adam's resources 110)} to offer a PaaS web server service to a consumer/tenant system 130. In the present example, the 50% availability characteristic of Adam's computing resources 110 limits the market for such a service, and Adam declines. Adam's contribution of his remaining resources 110 to a provider pool to support a separate PaaS service is described elsewhere herein.

Figure 3:
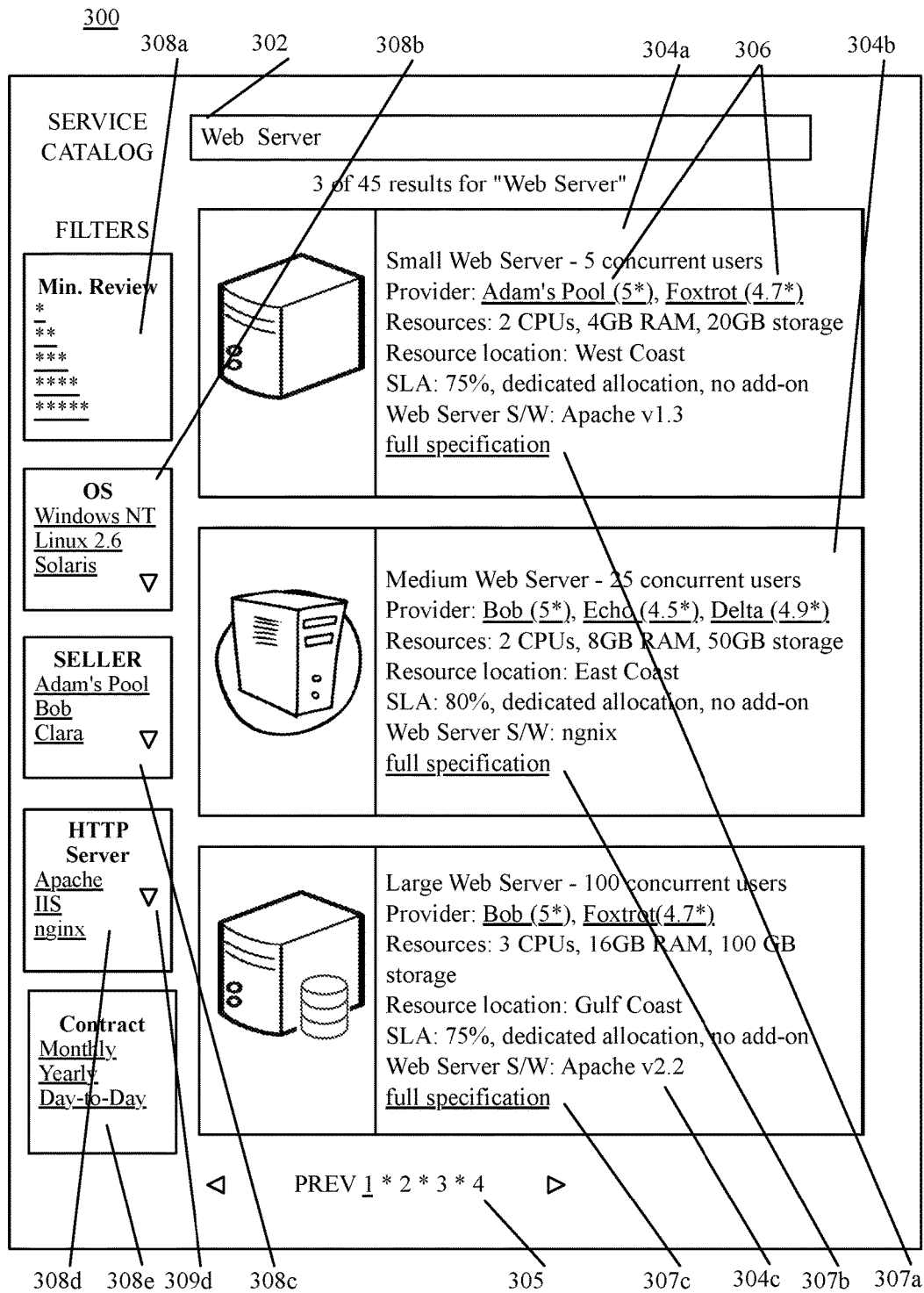
FIG. 3 is a diagram depicting a user interface for crowd-sourced cloud computing, in accordance with certain example embodiments.

The cloud provider system 120 publishes a searchable service catalog of each determined crowd-sourced cloud computing service to be offered—Block 240. Each service catalog entry includes an identifier for at least one provider of the service described in the service catalog entry. Referring to FIG. 3, and continuing to refer to prior figures for context, an example service catalog interface 300, in the form of an online marketplace 124 presented by cloud provider system 120 is shown. In the continuing example, interface 300 includes a search window 302. While the search window 302 of FIG. 3 is shown as a free text search window 302, other search approaches can be used, for example, full Boolean search, hierarchical search by service characteristics (for example IaaS, PaaS, SaaS—then under IaaS: storage, compute, connect), and selection from among discrete value choices for different service characteristics. The services marketplace 124 can return results responsive to the search query or selection. In the continuing example, the search query is "Web Server," and 45 results are returned, with three results 304a, 304b, and 304c shown on interface 300. Subsequent results are accessible using page control 305. Each search result 304 includes a photo or illustration representing the service and text descriptive of the service. The text includes a summary or subset of the full specification of the service.

The descriptive text can include an identifier 306 identifying each of one or more resource providers, or pool of resource providers, offering the service. Each resource provider identifier 306 is hyperlinked (as indicated by underlining in the figure) to a profile of the resource provider in the social network 125. Each resource provider identifier 306 includes an indication of the rating or ranking of the resource provider supporting the service. Selecting the hyperlinked identifier 306 will cause the user's computing device 130 to navigate to the profile page for the resource provider in the social network 125, where details of the rating/ranking are available, along with other information about the resource provider, and the services supported by the resource provider's resources 110.

The services marketplace 125 can filter the results 304 displayed in the interface 300. FIG. 3 illustrates five filters 308a-308e that can be applied to the search results 304. Each filter 308 can be applied for a selected filter value by selecting the hyperlinked value in the filter box 308. For example, the seller filter 308c can be applied to the results 304 by selecting one of the hyperlinked seller filter 308c values. For example, if a user selected "Adam's Pool" as a seller filter value, the page 300 would refresh, would retain result 304a (Adam's Pool is an identified provider), while results 304b and 304c would be replaced with entries, if any, for other Web Servers that are based on resources 110 provided by provider Adam's Pool. List extender 309d, when selected, displays additional filter choices.

In the continuing example, a consumer queries the online services marketplace 124 for "Web Server" services. The online services marketplace returns 45 results, showing three results 304a, 304b, and 304c, on the first page 300. Note that while neither registered provider Adam nor registered provider Lima is identified on page 300 as providing resources 100 supporting the services described in the search results 304, "Adam's Pool" is identified as a provider with a five star rating for a small web server service in result 304a. Pooled resources are described elsewhere herein.

Figure 4:
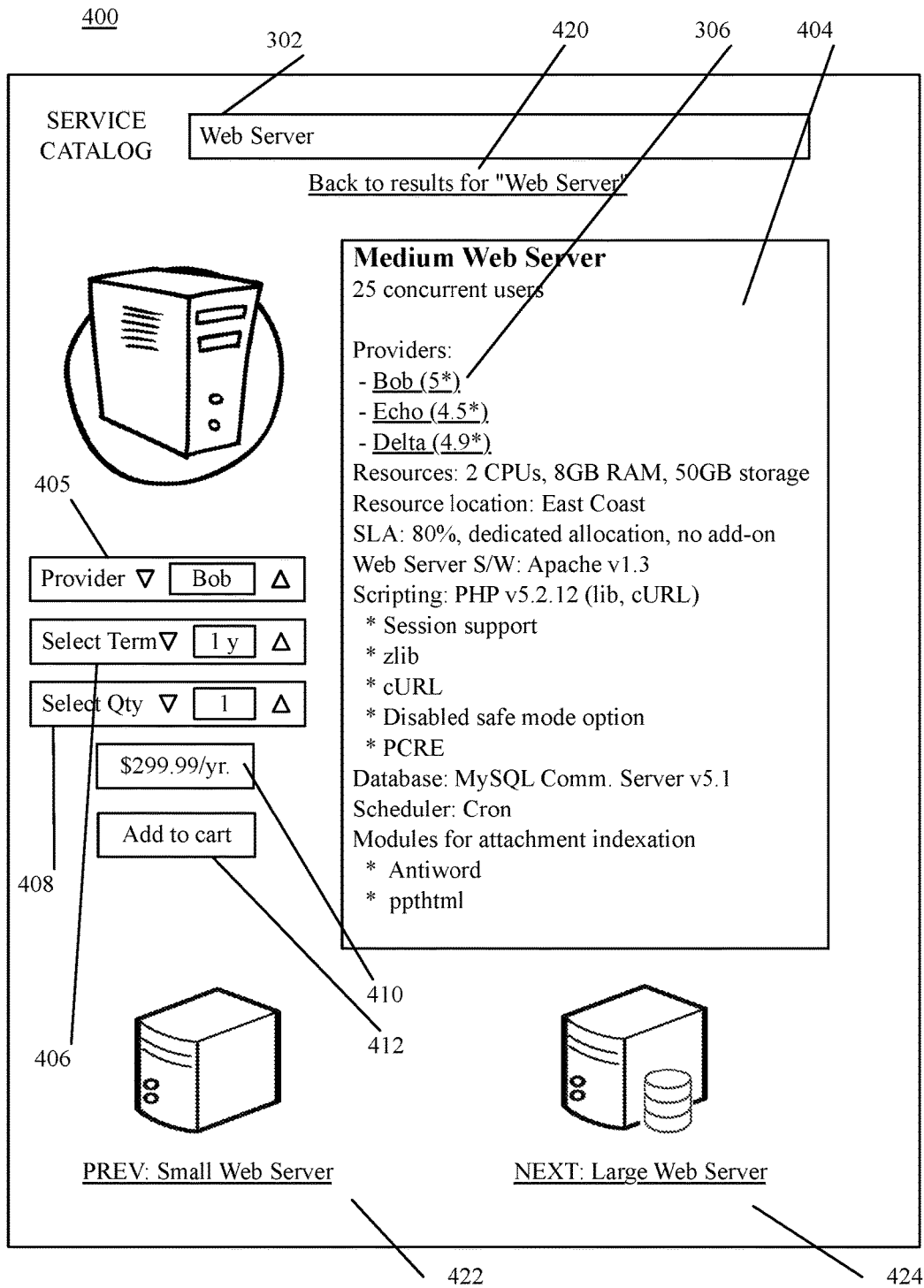
FIG. 4 is a diagram depicting a user interface for crowd-sourced cloud computing, in accordance with certain example embodiments.

Referring to FIG. 4, and continuing to refer to prior figures for context, a service catalog entry page 400 is shown, in accordance with example embodiments of the disclosed technology. Selection of either a given result 304 from search results page 300, or the "full specification" hyperlink 307 within a given result 304, causes the user's computing device to navigate to the service catalog entry page 400 corresponding to the result 304. In the continuing example, after the user selects either entry 304b or "full specification" hyperlink 307b, the user's computing device navigates to catalog entry page 400 for "Medium Web Server." Note that the search window 302 remains unchanged in this example. Text box 404 provides additional detail related to the Medium Web Server service, including identifiers 306 noting that the service is available from providers "Bob," "Echo," and "Delta." Service catalog entry page 400 includes purchase tools—provider selection tool 405, term selection tool 406, quantity selection tool 408, price information 410, and "Add to cart" tool 412. In addition, service catalog entry page 400 presents navigation links—one link 420 for returning to the search results page 300, one link 422 for navigating to the previous result from the search results page 300, and one link 424 for navigating to the next result from the search results page 300.

Figure 5:
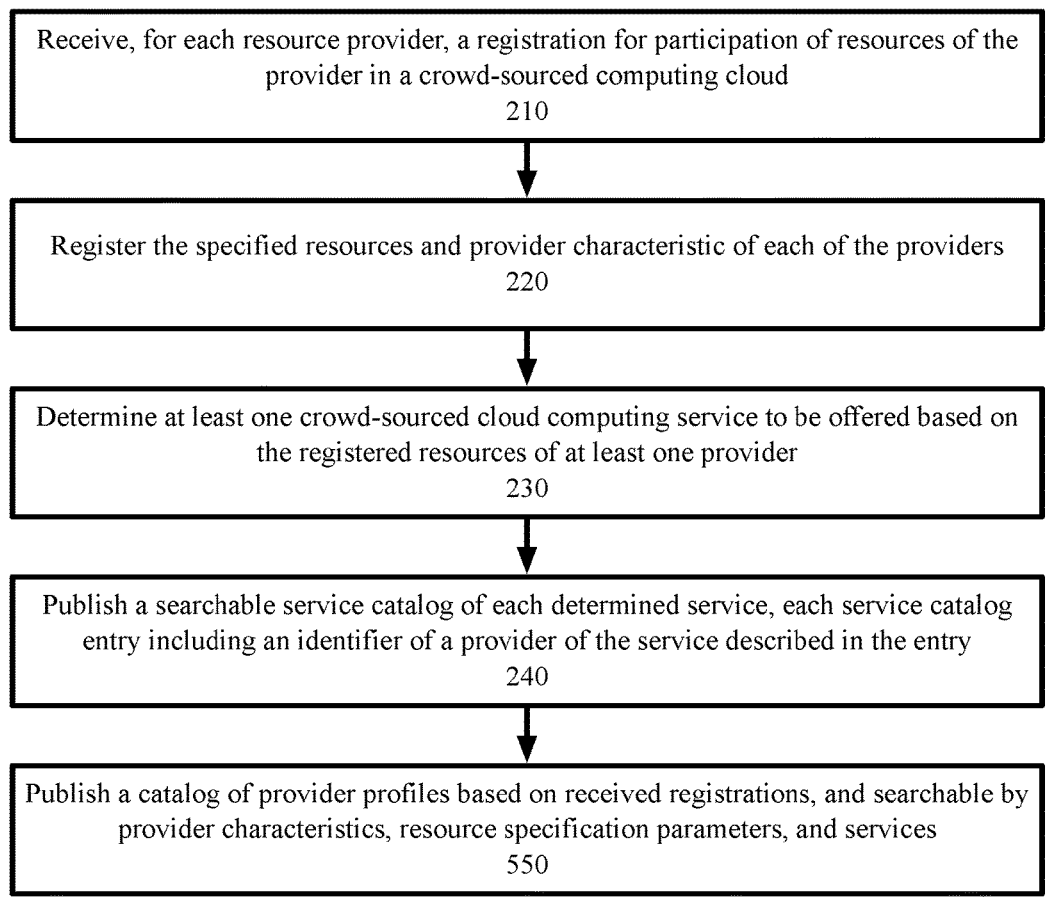
FIG. 5 is a block flow diagram depicting a method to provide crowd-sourced cloud computing services, in accordance with certain example embodiments.
Figure 6:
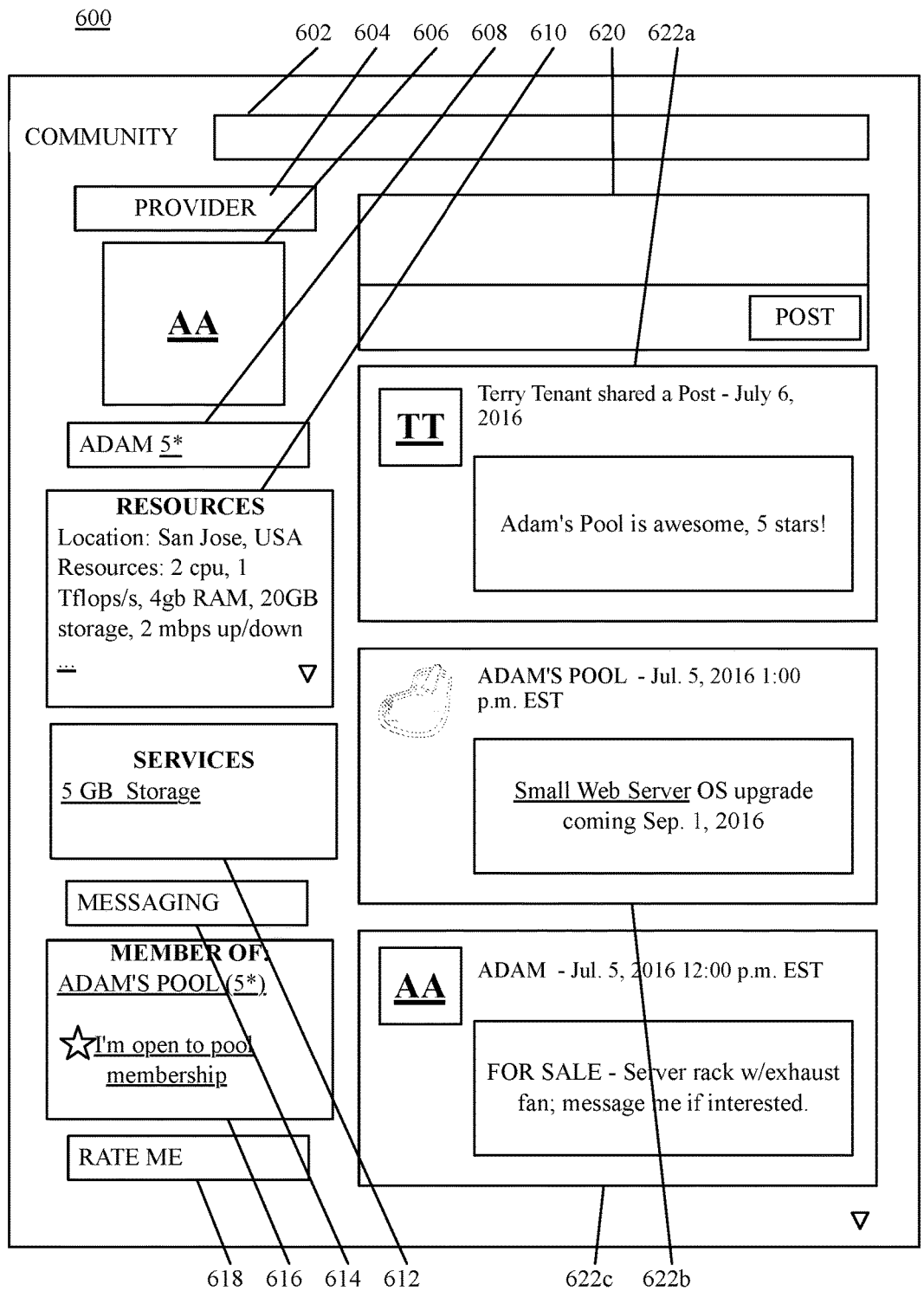
FIG. 6 is a diagram depicting a user interface for crowd-sourced cloud computing, in accordance with certain example embodiments.

Referring to FIG. 5, and continuing to prior figures for context, a block flow diagram depicting a method 500 to provide crowd-sourced cloud computing services is shown, in accordance with certain example embodiments. In such a method 500, Block 210—Block 240 are performed as disclosed elsewhere herein. In such a method 500, the cloud provider 120 publishes, a catalog of provider profiles—Block 550. Each provider profile is based on the received registration requests. In the continuing example, the catalog of provider profiles is organized as a social network 125 application and is searchable by provider characteristics, resource specification parameters, and services by the profiled provider. Referring to FIG. 6, and continuing to refer to prior figures for context, a catalog of provider profiles entry social network page 600 is shown, in accordance with example embodiments of the disclosed technology, and implemented as part of social network 125. The provider identifier 306 in a search result 304 and in a service catalog entry 400 is hyperlinked to the profile catalog entry 600 of the provider associated with the service described in the search result 304 and in a service catalog entry 400.

Page 600 includes a search window 602 similar to the search window of online marketplace 124 pages 300 and 400, though in this case a query entered into search window 602 is applied to profiles in the social network 125. Page 600 includes an indication of the type of profile 604, in this case a resource "Provider" profile, along with an avatar 606, and a provider identifier 608 including a rating summary hyperlinked to a detailed rating page for the provider. The resources 110 that have been registered by the provider are detailed in a resources box 610, while the services offered by the provider using the resources 110 are shown in a separate services box 612, with each service including a hyperlink to a page providing additional technical, performance, review, and administrative data regarding the resource.

Page 600 includes a link 614 to messaging functionality, allowing the provider to privately exchange messages with one or more other profiled stakeholders (group and consumer pages are described elsewhere herein). Both the profiled provider's membership in one or more resource 110 pools and the provider's availability to participate in additional resource pools is presented in a pool membership box 616. Each pool identifier is hyperlinked to navigate a user's browser to a profile page for the pool. The intent to join new pools is hyperlinked to one or more pages to facilitate resource pool management. Community rating is a feature of some embodiments of crowd-sourced cloud computing. Each stakeholder can rate encounters with other stakeholders and can rate services (in particular services consumed by the rater). To that end, each provider social network page includes a link 618 to a page for collecting both structured and freeform feedback from stakeholders.

A profile timeline includes a posting window 620 and a chronologically-arranged timeline of posts 622*a*, 622*b*, and 622*c*. In the continuing example, provider Adam had used window 620 to post "FOR SALE—Server rack w/exhaust fan; message me if interested" on Jul. 5, 2016. That post is visible on page 600 in post window 622*c*. A user with privileges to post on behalf of the Adam's Pool resource pool (profiled in a separate page described elsewhere herein) posted a notification 622*b* that the Small Web Server service offered by the resource pool Adam's Pool will undergo an operating system (OS) upgrade on Sep. 1, 2016. Adam's personal profile page 600 receives this post as a member of Adam's Pool. Adam's personal profile page 600 also receives posts from consumers of Adam's Pool resources 110, such as post 622*a* from Terry Tenant who rated Adam's pool as five stars and provided the freeform comment "Adam's Pool is awesome."

Referring to FIG. 7, and continuing to prior figures for context, a block flow diagram depicting a method 700 to provide crowd-sourced cloud computing services is shown, in accordance with certain example embodiments. In such a method 700, Block 220—Block 240 are performed as disclosed elsewhere herein for a first provider. In such a method 700, prior to registering providers (Block 220), registration information including an intent to pool resources is received by the cloud provider system 120—Block 710.

The cloud provider 120, after completing registration (Block 220) and determining services to be offered using the registered resources 110 (Block 230), publishes a catalog of provider profiles as described with regard to FIG. 5 and FIG. 6, including an indication of the intent to pool resources 110 for those providers expressing such intent, as described in connection with FIG. 6. The cloud provider 120 receives, from a second registered provider, a request to pool a subset of the second provider's registered resources with the subset of the registered resources of the first provider—Block 760. In the continuing example, after Alan registers his resources 110A, and after Lima registers her resources, Lima browses resource provider profiles, such as Alan's profile 600, and decides to pool her resources with Alan's to form a pool. Lima selects the "I'm open to pool membership" link in Alan's profile box 616. Cloud provider 120 presents a dialog via Lima's provider system 110B allowing Lima to indicate which of her resources 110B will be pooled with those resources 110 made available for pooling by Alan. In some embodiments, the cloud provider system 120 accepts constraints on pooling relationships from providers. In such embodiments, the system will pool Alan's resources 110A and Lima's resources 110B subject to such constraints. As an example, geographic region and common ISP can be constraints on pooling selected by a resource provider or by the cloud provider system 120.

If all applicable constraints are satisfied, the cloud provider 120 pools the subset of the second provider's registered resources and the subset of the registered resources of the first provider—Block 770. In the example Provider Adam's Pool can offer services supported by an aggregate set of resources 110 by combining Adam's pooling resources 110A (all of Adam's resources minus the 5 GB storage service that Adam offers separately) and Lima's resources 110B as shown in TABLE 2. Pooling resources includes considering the resources as commonly available to support delivery of one or more cloud computing services. In some embodiments, the cloud provider system 120 maintains a configuration database of resources considered "pooled."

TABLE 2

| Parameter | Provider Adam's Pool |
|---|---|
| Address | San Jose, USA |
| Resources | 4 CPUs, 2 TFLOPS, 12 GB RAM, 35 GB storage, 2 Mbps up & down, |
| Servers | 5 |
| Connectivity | 10.1.1.1, 10.1.1.2, 10.2.1.1, 10.2.1.2, 10.2.1.3 |
| Internet Service Provider | ISP #1, router IP addresses 10.1.1.0, 10.2.1.0 |
| Service Level | 85% available processing, 99% available storage, flexible resource allocation policy, add-on resource flexibility |
| Allocation | Best effort |
| Add On Resource Limit | 10% CPU, 10% RAM, 10% storage |
| Operating System Version | Linux, Linux, Windows 8, Linux, Linux |
| Payment options | Credit/debit/bank draft |
| Group intent | Yes |
| IaaS resource cost | $29/mo. in aggregate |

The cloud provider determines at least one service to be offered based on the pooled resources, updates the services catalog based on the determined services, and updates the catalog of provider profiles with a profile of the resource pool—Block 780. In the continuing example, subsequent pooling of resources 110 by Adam and Lisa with other providers, along with supplemental resources 127 from the cloud provider system 120, allow Adam's Pool to support several services across IaaS, PaaS, and SaaS service types upon a re-determination (Block 230) of the services that the pooled resources 110 are capable of supporting. The cloud provider 120 updates the services marketplace 124 with the new services supported by Adam's Pool (Block 240) and updates the social network 125 with a profile of Adam's Pool.

Figure 8:
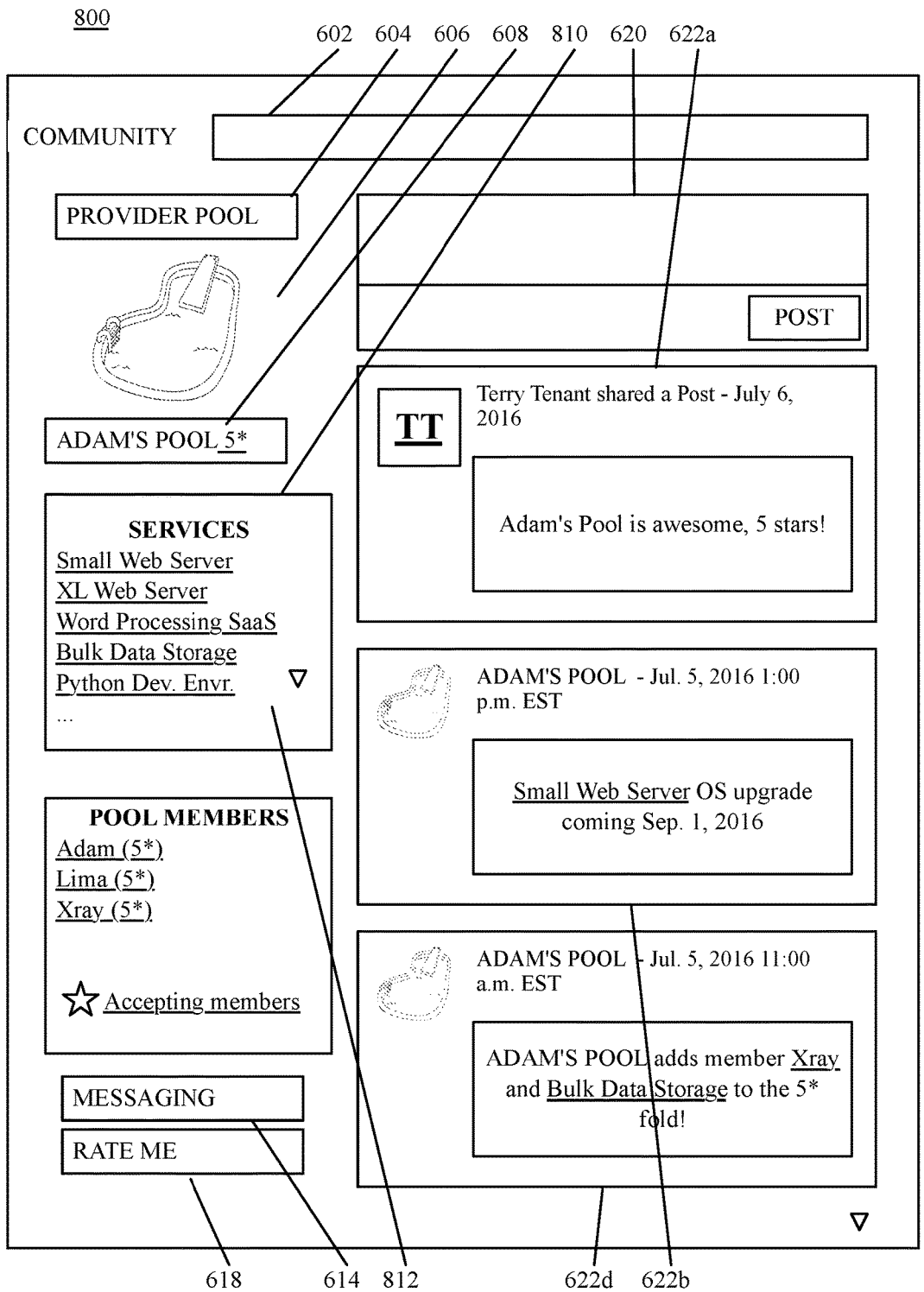
FIG. 8 is a diagram depicting a user interface for crowd-sourced cloud computing, in accordance with certain example embodiments.

Referring to FIG. 8, and continuing to refer to prior figures for context, a pooled provider social network page 800 is shown, in accordance with example embodiments of the disclosed technology, and implemented as part of social network 125. Page 800 is similar to page 600, but is directed to pooled resources provider Adam's Pool as opposed to being directed to Adam as a single resource provider. Features such as search window 602, type of profile 604 (in this case a "Provider Pool" profile), an avatar 606, and a provider identifier 608 including a rating summary hyperlinked to a detailed rating page for the provider are shown.

The services offered by the pool provider using the resources 110 are shown in a separate services box 612, with each service including a hyperlink to a page providing additional technical, performance, review, and administrative data regarding the resource. In the continuing example, Adam's Pool used the cloud provider system 120 supplemental services to offer PaaS services (Python Development Environment, XL Web Server, and Small Web Server) and SaaS services (Word processing), in addition to offering IaaS service Bulk Datastore.

Page 800 includes a link 614 to messaging functionality, allowing the pool provider to privately exchange messages with one or more other profiled stakeholders (group and consumer pages are described elsewhere herein). Community rating is a feature of some embodiments of crowd-sourced cloud computing. Each stakeholder can rate encounters with other stakeholders and can rate services (in particular services consumed by the rater). To that end, each pool provider social network page 800 includes a link 618 to a page for collecting both structured and freeform feedback from stakeholders.

A profile timeline includes a posting window 620 and a chronologically-arranged timeline of posts 622a, 622b, and 622d. In the continuing example, provider Adam's Pool used window 620 to post "ADAM'S POOL adds member Xray and Bulk Data Storage to the 5* fold!" on Jul. 5, 2016. That post is visible on page 800 in post window 622d. A user with privileges to post on behalf of the Adam's Pool resource pool (profiled in a separate page described elsewhere herein) posted a notification 622b that the Small Web Server service offered by the resource pool Adam's Pool will undergo an operating system (OS) upgrade on Sep. 1, 2016. The Adam's Pool profile page 800 also receives posts from consumers of Adam's Pool resources 110, such as post 622a from Terry Tenant who rated Adam's pool as five stars and provided the freeform comment "Adam's Pool is awesome."

Referring to FIG. 9, and continuing to prior figures for context, a block flow diagram depicting a method 900 to provide crowd-sourced cloud computing services is shown, in accordance with certain example embodiments. In such a method 900, Block 220—Block 240 are performed as disclosed elsewhere herein, resulting in a service catalog published as an online marketplace 124 by cloud provider 120. In such a method 900, the cloud provider system receives a selection of a published offered service—Block 950. In the continuing example, the cloud provider system 125 receives Cindy's selection, via tenant system 130, of one 1-year subscription to Bob's Medium Web Service via online marketplace 124 page 400.

Figure 10:
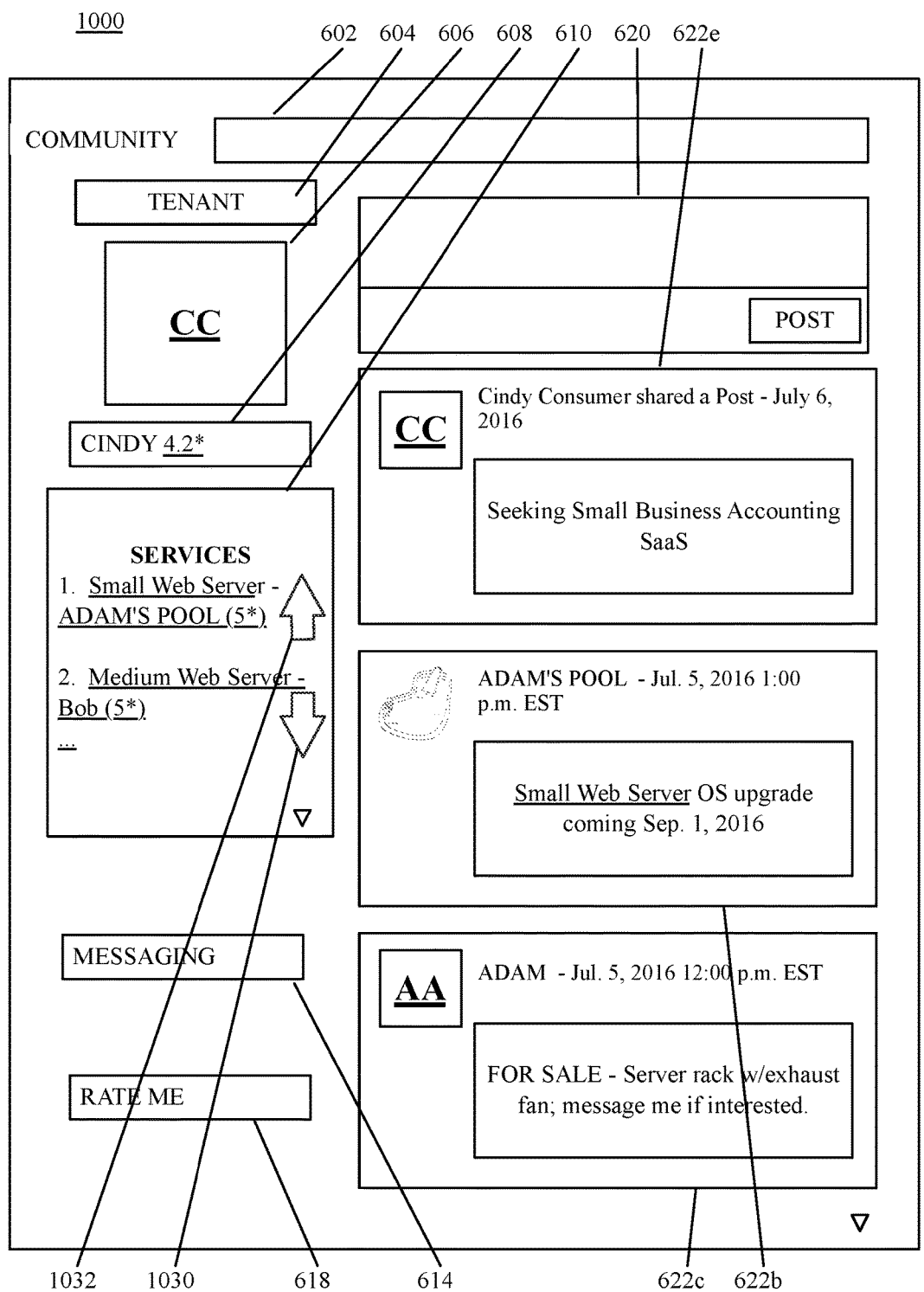
FIG. 10 is a diagram depicting a user interface for crowd-sourced cloud computing, in accordance with certain example embodiments.

The cloud provider system provisions and operates the selected service for the consumer (now a tenant)—Block 960. In some embodiments, the cloud provider system established a profile for the tenant. Referring to FIG. 10, and continuing to refer to prior figures for context, a tenant social network page 1000 is shown, in accordance with example embodiments of the disclosed technology, and implemented as part of social network 125. Page 1000 is similar to page 600, but is directed to a cloud tenant as opposed to being directed to Adam as a resource provider. Features such as search window 602, type of profile 604 (in this case a "Tenant" profile), an avatar 606, and a tenant identifier 608 including a rating summary hyperlinked to a detailed rating page for the tenant are shown.

The services subscribed to by the tenant using the resources 110 are shown in a separate services box 610, with each service including a hyperlink to a page providing management functions for the tenant (such as subscription and payment modification, resource add-on requests, troubleshooting, and ratings input for the service), and additional technical and performance data regarding the service. In the continuing example, Cindy subscribed to both the Medium Web Server service supported by resource provider Bob, and the Small Web Server service supported by resource provider Adam's Pool. Status indicator 1030 shows that the Medium Web Server service is currently un-available, while status indicator 1032 shows that the Small Web Server is available. In the continuing example, Cindy can select the link for the Medium Web Server service in window 610 to troubleshoot that service.

Page 1000 includes a link 614 to messaging functionality, allowing the pool provider to privately exchange messages with one or more other profiled stakeholders (group and consumer pages are described elsewhere herein). Community rating is a feature of some embodiments of crowd-sourced cloud computing. Each stakeholder can rate encounters with other stakeholders and can rate services (in particular services consumed by the rater). To that end, each tenant social network page 1000 includes a link 618 to a page for collecting both structured and freeform feedback from stakeholders. In each case of received feedback, the cloud provider system 120 updates the relevant entry in each of the services marketplace 124 and the social network 125.

A profile timeline includes a posting window 620 and a chronologically-arranged timeline of posts 622e, 622b, and 622c. In the continuing example, provider Adam's Pool posted on Jul. 5, 2016 that the Small Web Server service offered by the resource pool Adam's Pool will undergo an operating system (OS) upgrade on Sep. 1, 2016. That post is visible on page 800 in post window 622b because Cindy is a subscriber to the Small Web Server service supported by Adam's Pool. Tenant Cindy's profile page 1000 also receives posts from resource provider Adam (to whom Cindy's profile is connected by Cindy's choice in a manner common to social networks), such as post 622c. Tenant Cindy used posting window 620 to post that she is "Seeking Small Business Accounting SaaS." That post is visible in posting window 622e. By using a combination of personal massages, ratings, and postings, each stakeholder can communicate with other stakeholders.

Other Example Embodiments

FIG. 11 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device, for example, a system on chip (SOC), system on package (SOP), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Additionally, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and computer program products described herein address the challenges associated with cataloging cloud computing resources of a large number of resource providers (both individually and in pools of resources), translating resources into service to be offered to consumers, offering the services to consumers in an organized fashion amenable to the technical requirements of the consumer's needs, facilitating communication between system stakeholders. Absent such an approach, the vast reserve of spare computing resources distributed across non DC-users would not be available to support cloud computing services.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

We claim:

1. A method, comprising:
    receiving, by one or more computing devices and for each of a plurality of cloud computing resource providers, a registration request for participation of resources of each respective provider in a crowd-sourced computing cloud, each registration request comprising provider characteristics and a specification of the resources, each resource specification comprising resource specification parameters, wherein at least one received registration request comprises data indicating an intent of a first resource provider to pool a subset of a first resource provider's resources with resources of one or more other resource providers for participation in the crowd-sourced computing cloud;
    registering, by the one or more computing devices, the specified resources and provider characteristic of each of the plurality of providers in a database as available for supporting cloud computing services;
    publishing, by the one or more computing devices, a catalog of provider profiles, each provider profile based on the received registration requests, the catalog of provider profiles searchable by provider characteristics including any intent to pool resources, resource specification parameters, and cloud computing services determined to be offered by the profiled provider;
    receiving, by the one or more computing devices from a second registered provider, a request to pool a subset of a second provider's registered resources with the subset of the registered resources of the first provider; and
    pooling, by the one or more computing devices, the subset of the second provider's registered resources and the subset of the registered resources of the first provider to support a common cloud computing service in a crowd-sourced computing cloud;
    determining, by the one or more computing devices, at least one crowd-sourced cloud computing service to be offered based on the pooled registered resources;
    publishing, by the one or more computing devices, a searchable cloud computing service catalog comprising an entry for each determined crowd-sourced cloud computing service to be offered, each service catalog entry comprising an identifier for at least one pooled provider of the cloud computing service described in the cloud computing service catalog entry;
    receiving, by the one or more computing devices from a consumer, a selection of a published cloud computing service;
    provisioning, by the one or more computing devices, the selected cloud computing service; and
    operating, by the one or more computing devices and the resources of the cloud computing service, the provisioned cloud computing service.

2. The method of claim 1, further comprising:
    publishing, by the one or more computing devices, a catalog of provider profiles, each provider profile based on the received registration requests, the catalog of provider profiles searchable by provider characteristics, resource specification parameters, and cloud computing services determined to be offered by the profiled provider,
    wherein at least one provider identifier in at least one service catalog entry is hyperlinked to the profile catalog entry of the provider associated with the cloud computing service described in the at least one service catalog entry.

3. The method of claim 1, wherein the provider catalog is organized as a social network application.

4. The method of claim 1, wherein the data indicating an intent of the first provider to pool a subset of the first resource provider's resources with the resources of one or more other providers comprises a restriction on the characteristics of the registration request of the other providers.

5. The method of claim 1, wherein determining at least one cloud computing service to be offered comprises:
    determining, by the one or more computing devices, a set of cloud computing services that a subset of resources registered by at least one provider is capable of offering;
    presenting, by the one or more computing devices to the at least one provider, an identification of each cloud computing service in the set of services that the subset of resources registered by at least one provider is capable of offering; and
    receiving, by the one or more computing device from the at least one provider, a selection of at least one cloud computing service from the presented identification.

6. The method of claim 1, wherein:
    operating comprises collecting, by the one or more computing devices, operating metrics for each provisioned service, and
    the method further comprising:
        publishing, by the one or more computing devices, a catalog of provider profiles, each provider profile based on the received registration requests, the catalog of provider profiles searchable by provider characteristics, resource specification parameters, and cloud computing services determined to be offered by the profiled provider; and
        updating, by the one or more computing devices, each published provider profile based on the collected operating metrics applicable to cloud computing services offered using resources specified in the provider profile,
    wherein each service catalog entry comprises one of a link to the published profile of the provider offering the cloud computing service and a summary of the collected operating metrics applicable to the resource provider.

7. The method of claim 1, further comprising:
    publishing, by the one or more computing devices, a catalog of provider profiles, each provider profile based on the received registration requests, the catalog of provider profiles searchable by provider characteristics, resource specification parameters, and cloud computing services determined to be offered by the profiled provider;
    receiving, by the one or more computing devices, feedback from a consumer with respect to a particular cloud computing service; and
    updating, by the one or more computing devices, each published profile based on the received feedback applicable to cloud computing services offered using computing resources specified in the profile.

8. The method of claim 1, wherein the determined cloud computing service is one of infrastructure as a service (IaaS), platform as a service (PaaS), and software as a service (SaaS).

9. The method of claim 1, wherein the published service catalog is organized as an online marketplace.

10. Logic encoded on one or more tangible media for execution and when executed operable to:
receive, by one or more computing devices and for each of a plurality of resource providers, a registration request for participation of resources of each respective provider in a crowd-sourced computing cloud, each registration request comprising provider characteristics and a specification of the resources, each resource specification comprising resource specification parameters;
register, by the one or more computing devices, the specified resources and provider characteristic of each of the plurality of providers, wherein registering comprises validating the specification of resources including determining a reachability of the specified resources;
determine, by the one or more computing devices, at least one crowd-sourced cloud computing service to be offered based on the registered resources of at least one provider; and
publish, by one or more computing devices, a searchable service catalog comprising an entry for each determined crowd-sourced cloud computing service to be offered, each service catalog entry comprising an identifier for at least one provider of the cloud computing service described in the service catalog entry.

11. The logic of claim 10, further encoded on one or more tangible media for execution and when executed operable to:
publish, by the one or more computing devices, a catalog of provider profiles, each provider profile based on the received registration requests, the catalog of provider profiles searchable by provider characteristics, resource specification parameters, and cloud computing services determined to be offered by the profiled provider,
wherein at least one provider identifier in at least one service catalog entry is hyperlinked to the profile catalog entry of the provider associated with the cloud computing service described in the at least one service catalog entry.

12. The logic of claim 10, wherein the provider catalog is organized as a social network application.

13. The logic of claim 10, wherein:
at least one received registration request comprises data indicating an intent of a first resource provider to pool a subset of the first resource provider's resources with resources of one or more other resource providers for participation in the crowd-sourced computing cloud; and
the logic is further encoded on one or more tangible media for execution and when executed operable to:
publish, by the one or more computing devices, a catalog of provider profiles, each provider profile based on the received registration requests, the catalog of provider profiles searchable by provider characteristics including any intent to pool resources, resource specification parameters, and cloud computing services determined to be offered by the profiled provider;
receive, by the one or more computing devices from a second registered provider, a request to pool a subset of the second provider's registered resources with the subset of the registered resources of the first provider; and
pool, by the one or more computing devices, the subset of the second provider's registered resources and the subset of the registered resources of the first provider to support a common service in a crowd-sourced computing cloud,
wherein determining at least one crowd-sourced cloud computing service to be offered comprises determining at least one crowd-sourced cloud computing service to be offered based on the pooled resources.

14. The logic of claim 13, wherein the data indicating an intent of the first provider to pool a subset of the first resource provider's resources with the resources of one or more other providers comprises a restriction on the characteristics of the registration request of the other providers.

15. A system, comprising:
a storage device; and
a processor communicatively coupled to the storage device, wherein the processor executes application code instructions that are stored in the storage device to cause the system to:
receive, for each of a plurality of resource providers, a registration request for participation of resources of each respective provider in a crowd-sourced computing cloud, each registration request comprising provider characteristics and a specification of the resources, each resource specification comprising resource specification parameters;
register the specified resources and provider characteristic of each of the plurality of providers, wherein registering comprises validating the specification of resources including determining a reachability of the specified resources;
determine at least one crowd-sourced cloud computing service to be offered based on the registered resources of at least one provider; and
publish a searchable service catalog comprising an entry for each determined crowd-sourced cloud computing service to be offered, each service catalog entry comprising an identifier for at least one provider of the cloud computing service described in the service catalog entry.

16. The system of claim 15, wherein the processor further executes application code instructions that are stored in the storage device to cause the system to:
publish, by the one or more computing devices, a catalog of provider profiles, each provider profile based on the received registration requests, the catalog of provider profiles searchable by provider characteristics, resource specification parameters, and cloud computing services determined to be offered by the profiled provider,
wherein at least one provider identifier in at least one service catalog entry is hyperlinked to the profile catalog entry of the provider associated with the cloud computing service described in the at least one service catalog entry.

17. The system of claim 15, wherein the provider catalog is organized as a social network application.

18. The system of claim 15, wherein:
at least one received registration request comprises data indicating an intent of a first resource provider to pool a subset of the first resource provider's resources with resources of one or more other resource providers for participation in the crowd-sourced computing cloud; and
the processor further executes application code instructions that are stored in the storage device to cause the system to:
publish, by the one or more computing devices, a catalog of provider profiles, each provider profile based on the received registration requests, the catalog of provider profiles searchable by provider characteristics including any intent to pool resources, resource specification parameters, and cloud computing services determined to be offered by the profiled provider;

receive, by the one or more computing devices from a second registered provider, a request to pool a subset of the second provider's registered resources with the subset of the registered resources of the first provider; and pool, by the one or more computing devices, the subset of the second provider's registered resources and the subset of the registered resources of the first provider to support a common cloud computing service in a crowd-sourced computing cloud, wherein determining at least one crowd-sourced cloud computing service to be offered comprises determining at least one crowd-sourced cloud computing service to be offered based on the pooled resources.

* * * * *